United States Patent [19]

Stein et al.

[11] Patent Number: 4,814,368

[45] Date of Patent: Mar. 21, 1989

[54] SHELF STABLE CURABLE SILICONE CAULKING COMPOSITIONS

[75] Inventors: Judith Stein, Schenectady; Tracey M. Leonard; Sandra L. Pratt, both of Clifton Park, all of N.Y.

[73] Assignee: General Electric Company, Schenectady, N.Y.

[21] Appl. No.: 200,349

[22] Filed: May 31, 1988

[51] Int. Cl.$^4$ ............................................. C08J 7/14
[52] U.S. Cl. ................................... 524/158; 524/160; 524/195; 524/425; 524/714; 524/729; 524/742; 524/777
[58] Field of Search ............... 524/195, 425, 158, 160, 524/729, 742, 714, 777

[56] References Cited

U.S. PATENT DOCUMENTS

| | | | |
|---|---|---|---|
| 4,221,688 | 9/1980 | Johnson et al. | 260/39.3 M |
| 4,427,811 | 1/1984 | Elias et al. | 524/96 |
| 4,608,412 | 8/1986 | Freiberg | 524/724 |

Primary Examiner—Marquis, Melvyn I.
Attorney, Agent, or Firm—William A. Teoli; James C. Davis, Jr.; James Magee, Jr.

[57] ABSTRACT

Curable silicone caulking compositions are provided, employing an ionically polymerized silicone emulsion, a tetrafunctional organosilane, a tin condensation catalyst, calcium carbonate and tetramethylbutylguanidine, as a shelf stabilizer.

6 Claims, No Drawings

SHELF STABLE CURABLE SILICONE CAULKING COMPOSITIONS

BACKGROUND OF THE INVENTION

The present invention relates to a shelf stable silicone caulking composition utilizing emulsion prepared by the anionic polymerization of a cyclopolydiorganosiloxane, a polyfunctional organosilane, a tin condensation catalyst, a nonsiliceous filler, such as calcium carbonate, and tetraalkylorganoguanidine as a stabilizer.

Prior to the present invention, as shown by M. G. Elias et al., U.S. Pat. No. 4,427,811, an improvement in the manufacture of silicone emulsion convertible to elastomer having enhanced physical properties was achieved by incorporating filler into the emulsion after it had aged at least two weeks at room temperature, particularly where the filler was other than colloidal silica. A further improvement in silicone water-based elastomeric caulking materials is shown by A. L. Freiberg, U.S. Pat. No. 4,608,412, where a nonsiliceous filler, such as calcium carbonate, was incorporated into the emulsion when freshly made to produce a caulking material having a useful shelf life providing the caulking material also contained 2-amino-2-methyl-1-propanol.

The present invention is based on our discovery that shelf stable silicone caulking compositions, which yield elastomers upon removal of water, can be made by combining a nonsiliceous filler, such as calcium carbonate, with an emulsion prepared by the anionic polymerization of cyclic polydiorganosiloxane, along with a polyfunctional organosilane, certain tin condensation catalyst as defined hereinafter, and a tetraalkylorganoguanidine, as a stabilizer. The caulking compositions also have been found to provide silicone elastomers exhibiting excellent physical properties.

STATEMENT OF THE INVENTION

There is provided by the present invention, curable silicone caulking compositions comprising, by weight, (A) 100 parts of a base formulation consisting essentially of an aqueous emulsion having 40 to 60% by weight solids, a pH in the range of from about 9–11, a silanol-terminated polydiorganosiloxane having a molecular weight in the range of 30,000 to 80,000, and an effective amount of an anionic surfactant, (B) 0.1 to 5 and preferably 0.5 to 1.5 parts of a silane cross-linker, (C) 0.3 to 2 and preferably 0.4 to 1.5 parts of a tin catalyst, (D) up to 50 parts of a nonsiliceous filler, and (E) 0.1 to 5 and preferably 0.5 to 1.5 parts of polyalkylorganoguanidine.

The silanol-terminated polydiorganosiloxanes which are used in the practice of the present invention can be made by the anionic polymerization of cyclopolydiorganosiloxanes, such as octamethylcyclotetrasiloxane, or hexamethyltrisiloxane. In addition to methyl, the organo radicals attached to silicon of the silanol-terminated polydiorganosiloxane can be $C_{(1-13)}$ monovalent hydrocarbon radicals or monovalent hydrocarbon radicals substituted with monovalent radicals inert during equilibration, during the formation of the silanol-terminated polydiorganosiloxane. Other radicals are, for example, phenyl, trifluoropropyl, vinyl, cyanoalkyl, and mixtures thereof with methyl radicals. Preferably, the silanol-terminated polydiorganosiloxane is a silanol-terminated polydimethylsiloxane.

Anionic surfactants which can be used to form the silicone emulsions of the present invention is preferably dodecylbenzene sulfonic acid. However, other aliphatically substituted benzenesulfonic acids or aliphatically substituted naphthalenesulfonic acids can be used as shown in Findlay et al., U.S. Pat. No. 3,294,725.

An effective amount of anionic surfactant is at least 0.1 part to about 5 parts by weight, per 100 parts of silanol-terminated polydiorganosiloane. Higher amounts can be used if desired without adverse results.

The polyfunctional silanecross-linker which can be used in the practice of the present invention is preferably ethylorthosilicate, or tetraethoxysilane. However, other cross-linking silanes can be used such as tetramethoxysilane or tetrapropoxysilane.

The tin condensation catalysts which can be used in the practice of the present invention is preferably dibutyl tindilaurate. However, other tin catalysts also can be utilized, such as a member selected from the class consisting of stannoxanes, hydroxystannoxanes, and monoalkoxyacylstannanes. More particularly, diacylstannoxane, acylhydroxystannoxane, monomethoxyacylstannanes, dihalostannoxane or halohydroxystannoxane have been found effective.

Among the tetraalkylorganoguanidine which can be used, there are included compounds having the formula,

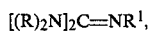

where R is a $C_{(1-8)}$ alkyl radical and $R^1$ is selected from hydrogen or R. R is more particularly selected from methyl, ethyl, propyl, and butyl.

Nonsiliceous fillers which can be used in the practice of the present invention to make the shelf stable caulking compounds are preferably calcium carbonate. However, other fillers such as titanium dioxide, aluminum oxide, zinc oxide, carbon black, and various pigments also can be used.

Additional ingredients which can be added to the composition are such things as antifoams to facilitate the mixing process, freeze-thaw stabilizers such as glycols to protect the composition during storage, and pigments.

In order that those skilled in the art will be better able to practice the present invention, the following examples are given by way of illustration and not by way of limitation. All parts are by weight.

EXAMPLE

In accordance with the procedure of Findlay et al., U.S. Pat. No. 3,294,725, there is prepared an aqueous emulsion of a silanol-terminated polydimethylsiloxane utilizing a charge of about 57% water and about 38% of octamethylcyclotetrasiloxane, along with an anionic polymerization catalyst, such ad dodecylbenzenesulfonic acid. The pH of the resulting emulsion is adjusted to 9–11, after the polymerization had been complete which results in a silanol-terminated polymer having a molecular weight of about 50,000 and an emulsion having about 50% solids.

A mixture of 1500 grams of the above emulsion and 600 grams of precipitated calcium carbonates is blended in a Ross double planetary mixer for 30–60 minutes, degassed, passed through a high-shear semco mixer for 15 minutes, and dispensed into anaerobically sealed cartridges.

The resulting cartridges are then injected with several ingredients. Some of the cartridges are injected with dibutyl tindilaurate in the form of a 33% aqueous solution, tetraethoxysilane (TEOS), and tetramethylbutylguanidine (TMBG). Additional cartridges are injected with other tin catalysts along with the same aforementioned ingredients. Control samples are also prepared following the same procedure without tetramethylbutylguanidine. Based on 100 grams of the base formulation, the resulting caulks, other than the control samples, have the following compositions:

|   | 1 | 2 | 3 | 4 | 5 | 6 | 7 |
|---|---|---|---|---|---|---|---|
| TMBG | 1.0 | 1.0 | 1.0 | 1.0 | 1.0 | 1.0 | 1.0 |
| TEOS | 1.0 | 1.0 | 1.0 | 1.0 | 1.0 | 1.0 | 1.0 |
| [bu$_2$Sn(OAc)]$_2$O | .53 | | | | | | |
| [bu$_2$Sn(OLaur)]$_2$O | | .78 | | | | | |
| [bu$_2$SnCl]$_2$O | | | .49 | | | | |
| bu$_2$Sn(OAc)Obu$_2$Sn(OH) | | | | .50 | | | |
| bu$_2$SnClObu$_2$Sn(OH) | | | | | .47 | | |
| bu$_2$Sn(OAc)(OMe) | | | | | | .58 | |
| bu$_2$Sn(OLaur)(OMe) | | | | | | | .82 |

The various blends are thoroughly mixed using a Semkit mixer. The resulting materials are allowed to cure for one week prior to tensile property measurements and a second portion is aged for two additional weeks in their respective cartridges prior to cure for one week and property measurement. Tensile properties are measured in accordance with ASTM standard D412. The following results are obtained:

|   | 1 | 2 | 3 | 4 | 5 | 6 | 7 |
|---|---|---|---|---|---|---|---|
| Tensile Strength (psi) | 188 (233)* | 195 (173) | 172 (220) | 169 (223) | 72 (191) | 197 (256) | 180 (200) |
| Strain (%) | 719 (602) | 543 (419) | 657 (576) | 718 (602) | 203 (542) | 181 (742) | 634 (597) |

*2 week data.

These results indicate that diacyl and dihalostannoxanes, acylhydroxy and halohydroxystannoxanes, and acylmethoxystannanes are excellent condensation catalysts for high pH curable silicone latexes containing tetramethylbutylguanidine as a stabilizer. The control samples free of TMBG gelled in the tube. These results show that tetramethylbutylguanidine is an excellent stabilizer for silicone latex compositions.

Although the above examples is directed to only a few of the very many variables which can be used in the practice of the present invention, it should be understood that the present invenion is directed to a much broader variety of silicone caulking compositions as shown in the description preceding this example.

What is claimed and sought to be protected by Letters Patent of the United States is as follows:

1. Curable silicone caulking compositions comprising, by weight,
    (A) 100 parts of a base formulation consisting essentially of an aqueous emulsion having 40 to 60% by weight solids, a pH in the range of from about 9–11, a silanol-terminated polydiorganosiloxane, and an anionic surfactant,
    (B) 0.1 to 5 parts of a silane cross-linker,
    (C) 0.3 to 2 parts of a tin catalyst,
    (D) up to 50 parts of a nonsiliceous filler, and
    (E) 0.1 to 5 parts of tetraalkylorganoguanidine.

2. A curable silicone caulking composition in accordance with claim 1, where the silanol-terminated polydiorganosiloxane is a silanol-terminated polydimethylsiloxane.

3. A curable silicone caulking composition in accordance with claim 1, where the tin catalyst is dibutyltindilaurate.

4. A curable silicone caulking composition in accordance with claim 1, where the nonsiliceous filler is calcium carbonate.

5. A curable silicone caulking composition in accordance with claim 1, where the silane cross-linker is ethylorthosilicate.

6. A curable silicone caulking composition in accordance with claim 1, where tetraalkylorganoguanidine is tetramethylbutylguanidine.

* * * * *